US009888272B2

(12) United States Patent
Ge et al.

(10) Patent No.: US 9,888,272 B2
(45) Date of Patent: Feb. 6, 2018

(54) METHOD, TERMINAL AND CDN SERVER IN IPTV SYSTEM FOR REALIZING PLAYING WHILE DOWNLOADING (71) Applicant: ZTE Corporation, Shenzhen, Guangdong (CN)

(72) Inventors: Baolei Ge, Shenzhen (CN); Haipeng Liu, Shenzhen (CN); Hai Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/421,338

(22) PCT Filed: Aug. 13, 2013

(86) PCT No.: PCT/CN2013/081364
§ 371 (c)(1),
(2) Date: Feb. 12, 2015

(87) PCT Pub. No.: WO2014/026590
PCT Pub. Date: Feb. 20, 2014

(65) Prior Publication Data
US 2015/0222942 A1 Aug. 6, 2015

(30) Foreign Application Priority Data
Aug. 13, 2012 (CN) .......................... 2012 1 0286520

(51) Int. Cl.
H04N 7/173 (2011.01)
H04N 21/24 (2011.01)
(Continued)

(52) U.S. Cl.
CPC ..... H04N 21/2402 (2013.01); H04N 21/2381 (2013.01); H04N 21/44209 (2013.01);
(Continued)

(58) Field of Classification Search
CPC ....... H04N 21/44209; H04N 21/47208; H04N 21/2381; H04N 21/64322; H04N 21/6125
(Continued)

(56) References Cited

U.S. PATENT DOCUMENTS

2002/0129159 A1* 9/2002 Luby ....................... H04L 69/14
709/236
2009/0125634 A1 5/2009 Virdi
(Continued)

FOREIGN PATENT DOCUMENTS

CN 101227590 A 7/2008
CN 101635828 A 1/2010
(Continued)

OTHER PUBLICATIONS

International Search Report in international application No. PCT/CN2013/081364, dated Nov. 21, 2013.
(Continued)

Primary Examiner — Jivka Rabovianski
(74) Attorney, Agent, or Firm — Oppedahl Patent Law Firm LLC (57) ABSTRACT Method, terminal, CDN server and system in IPTV system for realizing playing while downloading, the method comprises: the terminal acquires the bit rate information of the media file which the terminal requires to play from the content distribution network CDN server, the CDN server returns a first reply message to the terminal after receiving the requirement, the first reply message piggybacks the bit rate information of the media file which said terminal requires to play, the terminal determines whether said bit rate information satisfies the condition of playing while downloading, if it satisfies, the terminal requires to download the file from said CDN server which user requires while plays said media file.

9 Claims, 3 Drawing Sheets (51) Int. Cl.
    *H04N 21/442*    (2011.01)
    *H04N 21/472*    (2011.01)
    *H04N 21/2381*   (2011.01)
    *H04N 21/61*     (2011.01)
    *H04N 21/643*    (2011.01)
(52) U.S. Cl.
    CPC ... *H04N 21/47208* (2013.01); *H04N 21/6125* (2013.01); *H04N 21/6175* (2013.01); *H04N 21/64322* (2013.01)
(58) Field of Classification Search
    USPC .................................................. 725/109, 62
    See application file for complete search history.

(56)             References Cited

U.S. PATENT DOCUMENTS

2009/0310673  A1     12/2009  Chung
2012/0265892  A1*    10/2012  Ma .................... H04N 21/23418
                                                                709/231
2014/0245359  A1*    8/2014   De Foy ............. H04N 21/6181
                                                                725/62

FOREIGN PATENT DOCUMENTS

CN       101651822 A      2/2010
CN       101741927 A      6/2010
CN       101751442 A      6/2010
CN       101795264 A      8/2010
CN       102123303 A      7/2011
CN       102571894 A      7/2012
CN       102843616 A      12/2012
WO       2011068784 A1    6/2011

OTHER PUBLICATIONS

English Translation of the Written Opinion of the International Search Authority in international application No. PCT/CN2013/081364, dated Nov. 21, 2013.

* cited by examiner

METHOD, TERMINAL AND CDN SERVER IN IPTV SYSTEM FOR REALIZING PLAYING WHILE DOWNLOADING

TECHNICAL FIELD

The disclosure relates to the field of communications, and in particular to a method, terminal, Content Delivery Network (CDN) server and system for realizing playing while downloading in an Internet Protocol Television (IPTV) system.

BACKGROUND

The IPTV is a brand-new technology which integrates multiple technologies such as the Internet technology, the multimedia technology and the communication technology by virtue of a broadband cable television network and provides many kinds of interactive service such as the digital television service for home users. The user can enjoy IPTV service in two manners at home: (1) a computer, and (2) an IP set-top box plus an ordinary television set. The IPTV can be well adapted to the current rapid development trend of the network, and can fully and effectively utilize the network resource. The IPTV transmits manageable multimedia services such as television signals, videos, texts, graphs and data through an IP network on the premise of ensuring the quality of service/service experience, safety, interactivity and reliability. Thus, it can be seen that the IPTV is a manageable multimedia service in need of quality of service and safety guarantee, and is obviously different from an uncontrollable and unmanageable streaming media application on the Internet of which the quality and safety cannot be ensured.

The Real Time Streaming Protocol (RTSP) defines how to make a one-to-multiple application program effectively transmit multimedia data through the IP network, and the RTSP serves as the remote network control for a multimedia server.

At present, when using the IPTV, the user can only separately make a request of downloading or playing a media file to a CDN server through a set-top box, but cannot simultaneously download and play the media file. However, along with the continuous upgrade of the bandwidth available for users, such a separate downloading or playing mode may cause that a great lot of bandwidth is idled, and cannot meet the user's requirement on an IPTV service.

SUMMARY

The embodiments of the disclosure provide a method, terminal, CDN server and system for implementing playing while downloading in an IPTV system, so as to realize the downloading of a media file without having influence on the TV watching, fully utilizing the network resource of the user.

An embodiment of the disclosure provides a method for implementing playing while downloading in an IPTV system, which includes that:

a terminal acquires code rate information of a media file requested by the terminal to be played from a CDN server, determines whether the code rate meets a playing-while-downloading condition, and If the code rate meets the playing-while-downloading condition, makes a request of downloading a file which is requested to be downloaded by a user to the CDN server while playing the media file.

Preferably, the step that the terminal acquires the code rate information of the media file requested by the terminal to be played from the CDN server may include that:

the terminal sends to the CDN server a first request message which carries information of the media file requested by the terminal to be played, and receives from the CDN server a first response message which carries a code rate of the media file requested by the terminal to be played and a field indicating that the CDN server supports a playing-while-downloading function.

Preferably, the playing-while-downloading condition may include that:

a difference between a current bandwidth of the terminal and the code rate of the media file requested to be played is greater than a preset threshold value.

Preferably, the step that the terminal makes the request of downloading the file which is requested to be downloaded by the user to the CDN server while playing the media file may include that:

the terminal sends to the CDN server a second request message which carries information of the file which is requested to be downloaded by the user and a field indicating that the terminal supports the playing-while-downloading function; and the terminal downloads the file which is requested to be downloaded by the user from the CDN server according to a path of the file which is requested to be downloaded by the user, a username and a password, which are carried in a second response message sent by the CDN server, and simultaneously receives a code stream of the media file from the CDN server for playing.

Preferably, the method may further include that:

during the downloading-while-playing process, the terminal feeds packet loss information of the played code stream back to the CDN server through a heartbeat message, so that the CDN server regulates a downloading bandwidth after receiving the packet loss information until the packet loss information is not received any longer.

An embodiment of the disclosure also provides another method for implementing playing while downloading in an IPTV system, which includes that:

a CDN server receives a first request message of acquiring code rate information of a media file requested by a terminal to be played from the terminal;

the CDN server sends to the terminal a first response message which carries the code rate information of the media file requested by the terminal to be played and a field indicating that the CDN server supports a playing-while-downloading function so as to help the terminal to determine whether the code rate meets a playing-while-downloading condition or not;

the CDN server receives from the terminal a second request message which carries information of a file which is requested to be downloaded by a user of the terminal and a field indicating that the terminal supports the playing-while-downloading function; and the CDN server sends to the terminal a second response message which carries a path of the file which is requested to be downloaded by the user, a username and a password, and simultaneously sends a code stream of the media file to the terminal.

Preferably, the method may further include that:

during the downloading-while-playing process, the CDN server receives packet loss information, which is fed back by the terminal through a heartbeat message, of the played code stream; and the CDN server regulates a bandwidth of the downloading until the packet loss information fed back by the terminal is not received any longer.

An embodiment of the disclosure also provides a terminal, which includes:

a bandwidth acquisition module, configured to acquire code rate information of a media file requested to be played from a CDN server;

a determination module, configured to determine whether the code rate meets a playing-while-downloading condition or not and notify a result of the determination to a playing-while-downloading module; and the playing-while-downloading module, configured to make a request of downloading a file which is requested to be downloaded by a user of the terminal to the CDN server while playing the media file, when the result of the determination indicates that the code rate meets the playing-while-downloading condition.

Preferably, the bandwidth acquisition module may be configured to acquire the code rate information of the media file requested to be played from the CDN server in a manner of:

transmitting to the CDN server a first request message which carries information of the media file requested by the terminal to be played, and receiving a first response message sent by the CDN server, the first response message carrying a code rate of the media file requested by the terminal to be played and a field indicating that the CDN server supports a playing-while-downloading function.

Preferably, the playing-while-downloading condition may include that:

a difference between a current bandwidth of the terminal and the code rate of the media file requested to be played is greater than a preset threshold value.

Preferably, the playing-while-downloading module may be configured to make the request of downloading the file which is requested to be downloaded by the user to the CDN server while playing the media file in a manner of:

transmitting to the CDN server a second request message which carries information of the file which is requested to be downloaded by the user and a field indicating that the terminal supports the playing-while-downloading function; and downloading the file which is requested to be downloaded by the user from the CDN server according to a path of the file which is requested to be downloaded by the user, a username and a password, which are carried in a second response message sent by the CDN server, and simultaneously receiving a code stream of the media file from the CDN server for playing.

Preferably, the terminal may further include: a playing monitoring module, which is configured to: during the downloading-while-playing process, feed packet loss information of the played code stream back to the CDN server through a heartbeat message, so that the CDN server regulates a downloading bandwidth of a media server.

An embodiment of the disclosure also provides a CDN server for realizing playing while downloading in an IPTV system, which includes: an RTSP server and a media server.

The RTSP server includes:

a receiving module, configured to: receive a first request message of acquiring code rate information of a media file requested to be played and a second request message from a terminal and notify a bandwidth response module and a playing-while-downloading response module, in which the second request message carries information of a file which is requested to be downloaded by a user and a field indicating that the terminal supports a playing-while-downloading function;

the bandwidth response module, configured to: send a first response message to the terminal after receiving the notification from the receiving module, in which the first response message carries the code rate information of the media file requested by the terminal to be played and a field indicating that the CDN server supports the playing-while-downloading function so as to help the terminal to determine whether the code rate meets a playing-while-downloading condition or not; and the playing-while-downloading response module, configured to: send a second response message to the terminal after receiving the notification from the receiving module, the second response message carrying a path of the file which is requested to be downloaded by the user, a username and a password, and simultaneously notify the media server to send a code stream of the media file to the terminal.

The media server is configured to: send the code stream of the media file to the terminal after receiving the notification from the playing-while-downloading response module, and provide to the terminal the file requested to be downloaded by the user.

Preferably, the RTSP server may further include: a bandwidth regulation module.

The receiving module may be further configured to: during the downloading-while-playing process, receive packet loss information, which is fed back by the terminal through a heartbeat message, of the played code stream, and notify the bandwidth regulation module.

The bandwidth regulation module may be configured to: notify the media server to regulate a downloading bandwidth until the packet loss information fed back by the terminal is not received any longer.

The media server may be further configured to: regulate the downloading bandwidth after receiving the notification from the bandwidth regulation module.

An embodiment of the disclosure further provides a system for realizing playing while downloading in an IPTV system, which includes the abovementioned terminal and the abovementioned CDN server.

According to the method, terminal, CDN server and system for realizing playing while downloading in the IPTV system provided by the embodiments of the disclosure, it is able to provide playing-while-downloading service in the IPTV system to the user by virtue of RTSP and File Transfer Protocol (FTP), so that the media file can be downloaded when the user is watching video or TV, without influence on the user's watching. Thus, the network resource of the user is fully utilized, an experience of the user is improved, and diversified value-added services are brought to an operator.

PREFERRED DETAILED DESCRIPTION

The embodiments of the disclosure are described below with reference to the drawings in detail. It should be noted that the embodiments of the disclosure and the features in the embodiments can be freely combined if they do not conflict with each other.

Embodiment

Figure 1:
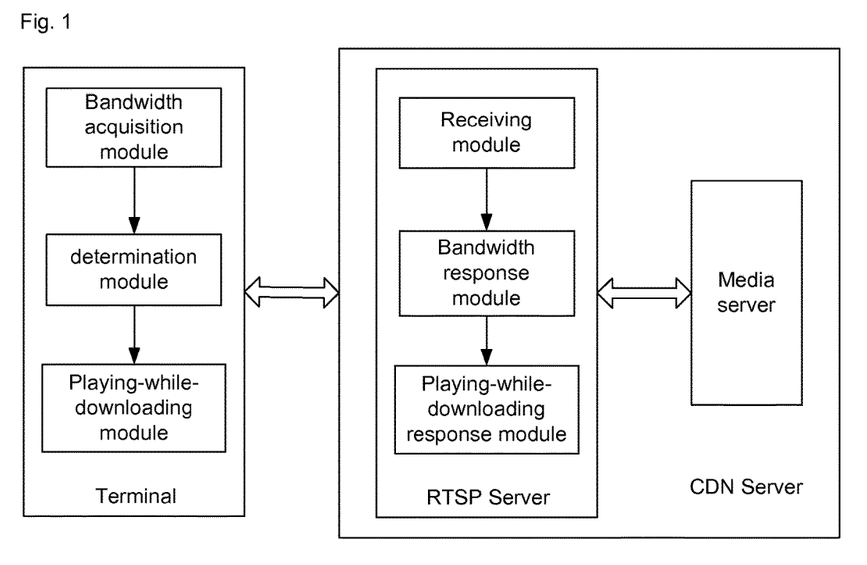
FIG. 1 is a structure diagram of a system for implementing playing while downloading in an IPTV system according to an embodiment.

As shown in FIG. 1, an embodiment provides a system for implementing playing and downloading simultaneously in an IPTV system, which includes: a terminal and CDN server for implementing playing and downloading simultaneously in the IPTV system.

The terminal includes a bandwidth acquisition module, a determination module and a playing-while-downloading module.

The bandwidth acquisition module is configured to acquire from the CDN server a code rate of a media file requested by the terminal to be played.

The bandwidth acquisition module sends to the CDN server a first request message carrying information of the media file requested by the terminal to be played, and receives a first response message returned by the CDN server which is carried with a code rate of the media file requested by the terminal to be played and a field indicating that the CDN server supports the function of playing and downloading at the same time.

The determination module is configured to determine whether the code rate can meet the playing-while-downloading condition and generate a determination result.

The playing-while-downloading condition includes that: a difference generated through a current bandwidth of the terminal minus the code rate of the media file requested to be played is greater than a preset threshold value.

The playing-while-downloading module is configured to make a request of downloading a file requested by a user to the CDN server while playing the media file, when the determination result indicates that the code rate meets the playing-while-downloading condition.

The playing-while-downloading module sends to the CDN server a second request message, for example, a SET_PARAMETER request message. The second request message is carried with information of the file to be downloaded by the user and a field indicating that the terminal supports the playing-while-downloading function.

The terminal downloads the file requested by the user according to a path of the file to be downloaded, a username and a password, which are carried in a second response message returned by the CDN server, and simultaneously receives a code stream of the media file from the CDN server for playing.

In addition, the terminal may further include: a playing monitoring module, configured to, during the downloading-while-playing process, feed packet loss information of the code stream for playing back to the CDN server through a heartbeat message, so that the CDN server regulates a downloading bandwidth of a media server.

In addition, the embodiment also provides a CDN server for implementing playing while downloading in an IPTV system, which includes an RTSP server and a media server.

The RTSP server includes: a receiving module, a bandwidth response module and a playing-while-downloading response module.

The receiving module is configured to receive a first request message of acquiring code rate of a media file requested to be played and a second request message from a terminal and notify the bandwidth response module and the playing-while-downloading response module. The second request message carries information of a file to be downloaded by a user and a field indicating that the terminal supports the playing-while-downloading function.

The bandwidth response module is configured to return a first response message to the terminal after receiving the notification from the receiving module. The first response message carries the code rate of the media file requested by the terminal to be played and a field indicating that the CDN server supports the playing-while-downloading function, so as to help the terminal to determine whether the code rate can meet the playing-while-downloading condition or not.

The playing-while-downloading response module is configured to return a second response message to the terminal after receiving the notification from the receiving module. The second response message carries a path of the file to be downloaded by the user, a username and a password, and the playing-while-downloading response module notifies the media server to return a code stream of the media file for playing to the terminal.

The media server is configured to return the code stream of the media file for playing to the terminal after receiving the notification from the playing-while-downloading response module, and provide the file requested by the user to the terminal.

In addition, the RTSP server may further include a bandwidth regulation module.

The receiving module is further configured to, during the downloading-while-playing process, receive packet loss information, which is fed back by the terminal through a heartbeat message, of the code stream, and notify the bandwidth regulation module.

The bandwidth regulation module is configured to notify the media server to regulate a downloading bandwidth, until the packet loss information fed back by the terminal is not received any longer.

The media server is configured to regulate the downloading bandwidth after receiving the notification of the bandwidth regulation module.

Figure 2:
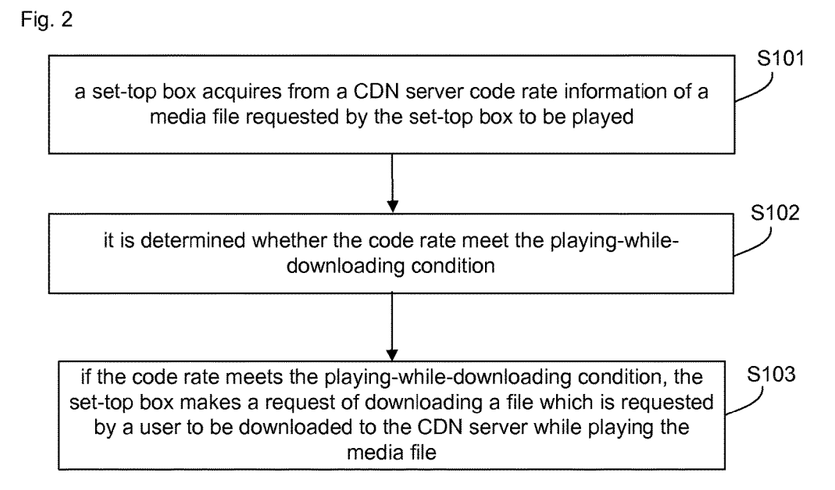
FIG. 2 is a flowchart of a method for implementing playing while downloading in an IPTV system on a terminal side according to an embodiment.

As shown in FIG. 2, a set-top box is taken as an example, and an embodiment provides a method for implementing playing while downloading in an IPTV system, which is implemented at a terminal side and includes the following steps.

Step 101: the set-top box acquires from a CDN server code rate information of a media file requested by the set-top box to be played.

Step 102: it is determined whether the code rate meets the playing-while-downloading condition, and if the code rate meets the playing-while-downloading condition, Step 103 is executed.

Step 103: the set-top box makes a request of downloading a file which is requested by a user to be downloaded to the CDN server while playing the media file.

In Step 101, the set-top box sends a first request message to the CDN server through the RTSP signalling. The first request message carries information, for example, a media filename, of the media file requested by the set-top box to be played, and also carries bandwidth information of the set-top box.

after the CDN server receives the first request message, if the server supports a playing-while-downloading function, the set-top box receives a first response message from the CDN server. The first response message carries a code rate of the media file requested by the set-top box to be played and a field indicating that the CDN server supports the playing-while-downloading function. For example, the first response message carries a field {bandwidth=1820000} indicating the code rate of the media file requested by the set-top box to be played, and carries a field {x-download: yes} indicating that the server supports the playing-while-downloading function.

In Step 102, the playing-while-downloading condition may include that:

a difference between a current bandwidth of the set-top box and the code rate of the media file requested to be played is greater than a preset threshold value.

In Step 103, the set-top box sends a second request message, for example, a SET_PARAMETER request message, to the CDN server. The second request message carries information of the file requested to be downloaded by the user and a field indicating that the terminal supports the playing-while-downloading function.

For example, the set-top box carries in the second request message a field {x-download:yes} indicating that the terminal supports the playing-while-downloading function and that the user has enabled the playing-while-downloading function, and carries fields {x-contentid} and {x-vcdnid} indicating an Identifier (ID) of the file requested to be downloaded by the user, so that the CDN server can determine the content of the file requested to be downloaded by the user.

In response to the second request message received from the set-top box, The CDN server returns a response message, i.e. a second response message to the set-top box. The response message carries information such as a path of the file requested to be downloaded by the user, a username and a password. The set-top box plays the media file and simultaneously starts a downloading flow after receiving the second response message from the CDN server. A specific process being implemented as follows: the set-top box downloads the file requested by the user according to the path of the file requested to be downloaded by the user, the username and the password, which are carried in the second response message returned by the CDN server, and simultaneously receives a code stream of the media file from the CDN server for playing.

In the above steps, the set-top box communicates with the CDN server through RTSP signalling.

In addition, in the embodiments, during the downloading-while-playing process, the set-top box may also feed packet loss information of the code stream of the media file back to the CDN server through a heartbeat message, and the CDN server notifies a media server to regulate a downloading bandwidth to ensure the watching smoothness of the user after receiving the packet loss information, until the packet loss information is not received any longer.

Figure 3:
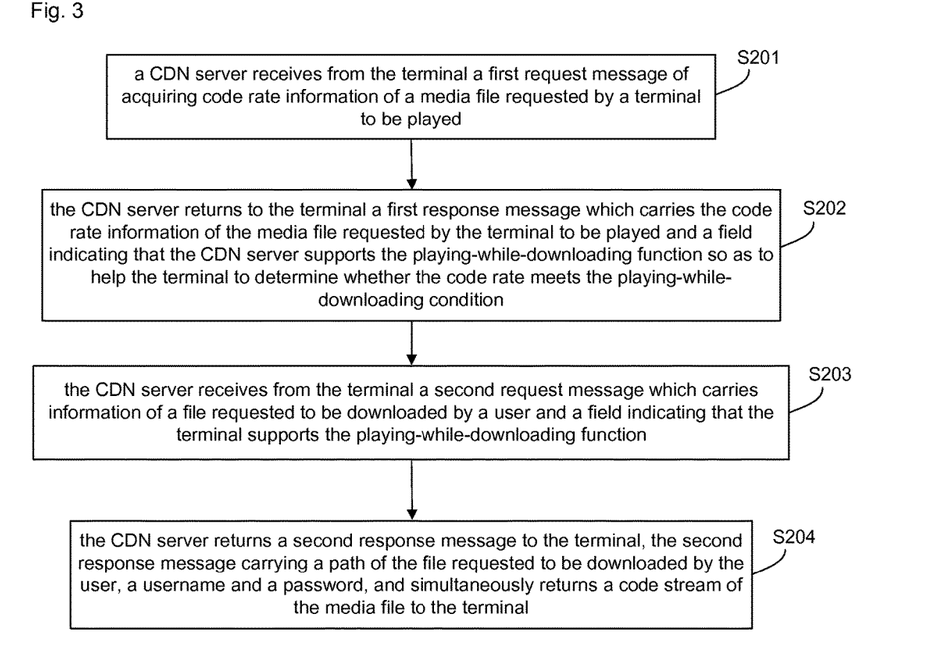
FIG. 3 is a flowchart of a method for implementing playing while downloading in an IPTV system on a CDN server according to an embodiment.

As shown in FIG. 3, an embodiment provides a method for implementing playing while downloading in an IPTV system, which is implemented at a CDN server side and includes the following steps.

Step 201: a CDN server receives from the terminal a first request message of acquiring code rate information of a media file requested by a terminal to be played.

Step 202: the CDN server returns a first response message to the terminal.

The first response message carries the code rate information of the media file requested by the terminal to be played and a field indicating that the CDN server supports the playing-while-downloading function, so as to help the terminal to determine whether the code rate meets the playing-while-downloading condition.

Step 203: the CDN server receives a second request message from the terminal.

The second request message carries information of a file requested to be downloaded by a user and a field indicating that the terminal supports the playing-while-downloading function.

Step 204: the CDN server returns a second response message to the terminal, and returns a code stream of the media file to the terminal.

The second response message carries a path of the file requested to be downloaded by the user, a username and a password. For example, the CDN server carries in the SET_PARAMETER (i.e., the response message) a field {x-filepath} representing the path of the file content, fields {x-ftpuser} and {x-ftppwd} representing an access username and an access password, and a field {x-contentExist: yes} representing that the CDN server stores the file requested to be downloaded by the user.

In addition, in the embodiment, during the downloading-while-playing process, the CDN server may further receive packet loss information, which is fed back by the terminal through a heartbeat message, of the code stream.

The CDN server regulates a downloading bandwidth to ensure the watching smoothness of the user after receiving the packet loss information until the packet loss information is not received any longer.

Figure 4:
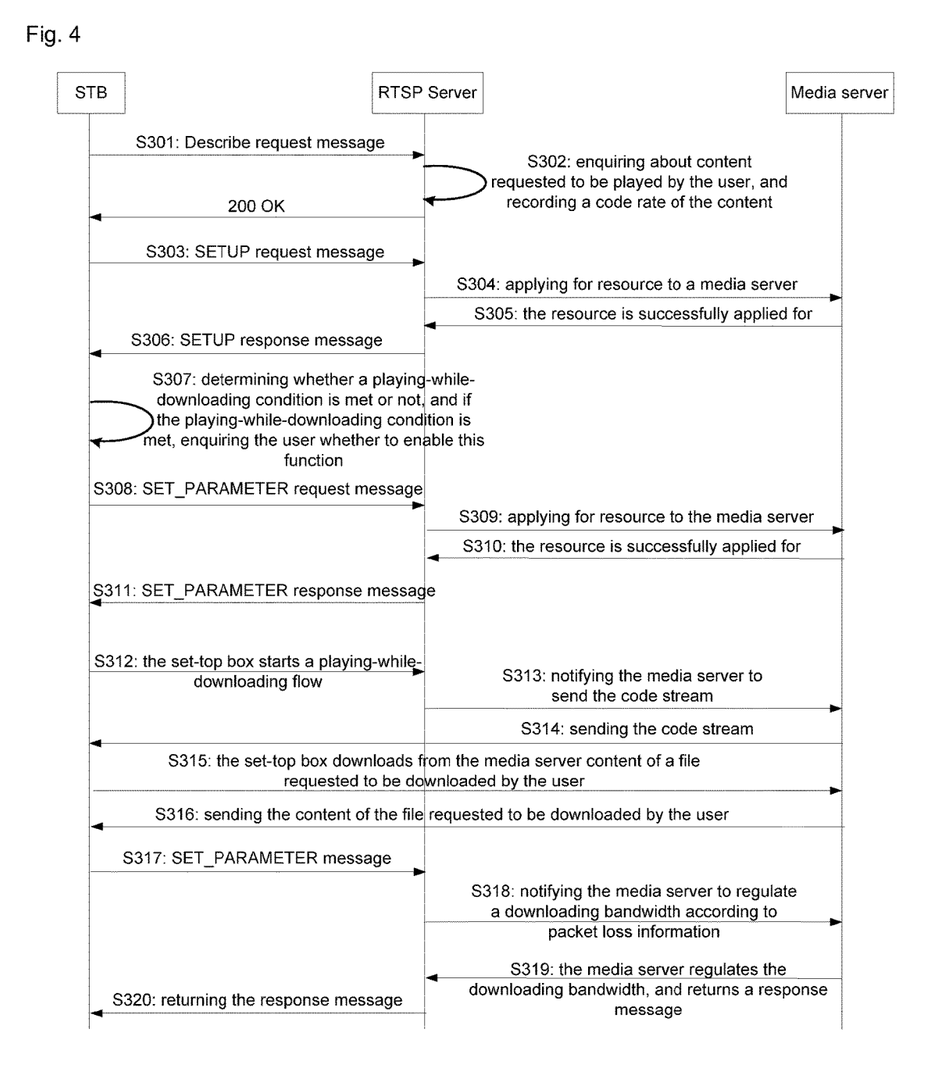
FIG. 4 is a flowchart of a method for implementing playing while downloading in an IPTV system according to an example.

In an example, if an IPTV user A has a 6 Mbps network bandwidth and the code rate of a TV program the user is watching is 3 Mbps. The user has a 3 Mbps surplus network bandwidth if there is no other network connection, and the surplus network bandwidth can be used to download required content or content such as an advertisement video of an operator for the user. Taking a set-top box as a terminal, a CDN server includes an RTSP server and a media server, the RTSP server directly interacts with the set-top box, and the media server is configured for media processing and transmission. As shown in FIG. 4, a method for implementing playing while downloading in an IPTV system is provided, which includes the following steps.

Step 301: the set-top box sends to the RTSP server an RTSP signalling Describe request message which carries content requested to be played by the user.

Step 302: the RTSP server searches for the content requested to be played by the user after receiving the Describe request message, and records a code rate of the content.

Step 303: the set-top box sends to the RTSP server a SETUP request message. A Transport field of the SETUP request message carries current bandwidth information of the terminal.

Step 304: the RTSP server applies for resource to the media server.

Step 305: if the resource is successfully applied for, the media server makes a response to the RTSP server.

Step 306: the RTSP server sends a SETUP response message to the set-top box, and carries a field {bandwidth=1820000} representing the code rate of the currently requested media file and a field {x-download:yes} representing that the server supports a playing-while-downloading function.

Step 307: the set-top box determines whether the playing-while-downloading condition is met. If the condition is met, the set-top box enquires the user whether to enable the playing-while-downloading function.

here, the set-top box extracts the code rate, represented by the field {bandwidth-1820000}, of the requested media file from the SETUP response message after receiving it, and compares the extracted code rate with a bandwidth carried in the request message of the set-top box. The playing-while-downloading function can be enabled if the bandwidth of the user is greater than the code rate of the media file by a certain proportion.

Step 308: if the user enables the playing-while-downloading function, the set-top box sends a SET_PARAMETER request message to the RTSP server. The SET_PARAMETER request message carries a field representing that the terminal supports the playing-while-downloading function and information of a file requested to be downloaded by the user.

For example, the SET_PARAMETER request message may be:
SET_PARAMETER*rtsp/1.0
x-download:yes
x-contentid:00000000020000001675
x-vcdnid:001

Step 309: the RTSP server applies for resource to the media server.

Step 310: if the resource is successfully applied for, the media server makes a response to the RTSP server;

Step 311: the RTSP sends a SET_PARAMETER response message to the set-top box. The SET_PARAMETER response message carries information such as a path of the file requested to be downloaded, a username and a password.

During Step 309 to Step 311, the RTSP server enquires to the media server whether the content of the file requested to be downloaded by the user exists or not after receiving the SET_PARAMETER request message. If the content of the file requested to be downloaded by the user exists, the RTSP server applies for an available resource for the user, enquires about the username and password of an FTP server, encrypts these information, and sends the information to the set-top box through the SET-PARAMETER response message.

Step 312: the set-top box starts a playing-while-downloading flow.

Step 313: the RTSP server notifies the media server to send the code stream.

Step 314: the media server sends the code stream to the set-top box.

Step 315: the set-top box downloads the content of the file requested to be downloaded by the user from the media server according to the SET_PARAMETER response message returned by the RTSP server.

Step 316: the media server sends the content of the file requested to be downloaded by the user to the set-top box;

Step 317: during the downloading-while-playing process, the set-top box sends a GET-PARAMETER request message (heartbeat message) to the RTSP server. The GET-PARAMETER request message carries packet loss information of a currently played media file.

Step 318: the RTSP server notifies the media server to dynamically regulate a downloading bandwidth according to the information contained in the GET-PARAMETER request message, such that the user can watch the program first of all.

Step 319: the media server regulates the downloading bandwidth, and returns a GET_PARAMETER response message to the RTSP server.

Step 320: the RTSP server sends a GET-PARAMETER response message to the terminal.

If the RTSP server continues receiving the packet loss information from the set-top box, Step 318-Step 320 are continuously executed until the packet loss information is not received any longer.

It can be seen from the above embodiments that, compared with the related art, the method, terminal, CDN server and system for implementing playing while downloading in the IPTV system provided by the embodiments have the advantages that it is able to provide playing-while-downloading service in the IPTV system to the user by virtue of RTSP and FTP, so that the media file can be downloaded when the user is watching video or TV, without influence on the user's watching. Thus, the network resource of the user is fully utilized, the experience of the user is improved, and diversified value-added services are brought to the operator.

Those skilled in the art should know that all or a part of steps in the method may be implemented by instructing related hardware through a program. The program can be stored in a computer-readable storage medium, for example, a read-only memory, a magnetic disk or an optical disk. Optionally, all or a part of steps in the embodiments may also be implemented by one or more integrated circuits. Correspondingly, each module/unit in the embodiments may be implemented in a hardware form as well as a software function module form. The disclosure is not limited to hardware and software combination in any specific form.

The above is only preferred embodiments of the disclosure and not intended to limit the disclosure. According to the summary of the disclosure, there may be other various embodiments, and those skilled in the art can make various corresponding modifications and transformations according to the disclosure without departing from the essence of the disclosure. Any modifications, equivalent replacements, improvements and the like within the principle of the disclosure shall fall within the scope of protection of the disclosure.

INDUSTRIAL APPLICABILITY

According to the embodiments of the disclosure, the media file can be downloaded without influence on the user's watching of TV or video. Thus, the network resource of the user is fully utilized, the experience of the user is improved, and diversified value-added services are brought to the operator.

What is claimed is:

1. A method for implementing playing while downloading in an Internet Protocol Television (IPTV) system, comprising:
acquiring, by a terminal, code rate information of a media file requested by the terminal to be played from a Content Delivery Network (CDN) server;
determining, by the terminal, whether the code rate meets a playing-while-downloading condition; and
in the case the code rate meets the playing-while-downloading condition, making, by the terminal, a request of downloading a file which is requested to be downloaded by a user of the terminal to the CDN server while playing the media file,
wherein the file requested to be downloaded by the user of the terminal is an advertisement video of an operator for the user, that is, the file requested to be downloaded and the media file requested by the terminal to be played are two different media files, wherein the acquiring, by the terminal, the code rate information of the media file requested by the terminal to be played from the CDN server comprises:
sending, by the terminal, a first request message to the CDN server, the first request message carrying information of the media file requested by the terminal to be played; and
receiving, by the terminal, a first response message sent by the CDN server, the first response message carrying a code rate of the media file requested by the terminal to be played and a field indicating that the CDN server supports a playing-while-downloading function,
wherein the playing-while-downloading condition is a condition that:
a difference between a current bandwidth of the terminal and the code rate of the media file requested to be played is greater than a preset threshold value,
wherein the making, by the terminal, the request of downloading the file which is requested to be downloaded by the user to the CDN server while playing the media file comprises:
sending, by the terminal, a second request message to the CDN server, wherein the second request message carries information of the file which is requested to be downloaded by the user and a field indicating that the terminal supports the playing-while-downloading function; and
downloading, by the terminal, the file which is requested to be downloaded by the user from the CDN server according to a path of the file which is requested to be downloaded by the user, a username and a password, which are carried in a second response message sent by the CDN server, and simultaneously receiving a code stream of the media file from the CDN server for playing, so as to make use of remaining bandwidth to download other media files different from the media file while playing the media file, realize the downloading of a media file without having influence on the TV watching.

2. The method according to claim 1, further comprising:
during the downloading-while-playing process, feeding, by the terminal, packet loss information of the played code stream back to the CDN server through a heartbeat message, so that the CDN server regulates a bandwidth of the downloading after receiving the packet loss information until the packet loss information is not received any longer.

3. A method for implementing playing while downloading in an Internet Protocol Television (IPTV) system, comprising:
receiving, by a Content Delivery Network (CDN) server, a first request message of acquiring code rate information of a media file requested by a terminal to be played from the terminal;
sending, by the CDN server, a first response message to the terminal, wherein the first response message carries the code rate information of the media file requested by the terminal to be played and a field indicating that the CDN server supports a playing-while-downloading function, so that the terminal can determine whether the code rate meets a playing-while-downloading condition;
receiving, by the CDN server, a second request message from the terminal, wherein the second request message carries information of a file which is requested to be downloaded by a user of the terminal and a field indicating that the terminal supports the playing-while-downloading function; and
sending, by the CDN server, a second response message to the terminal, the second response message carrying a path of the file which is requested to be downloaded by the user, a username and a password, and simultaneously sending a code stream of the media file to the terminal, so as to make use of remaining bandwidth to download other media files different from the media file while playing the media file, realize the downloading of a media file without having influence on the TV watching,
wherein the file requested to be downloaded by the user of the terminal is an advertisement video of an operator for the user, that is, the file requested to be downloaded and the media file requested by the terminal to be played are two different media files,
wherein the playing-while-downloading condition is a condition that:
a difference between a current bandwidth of the terminal and the code rate of the media file requested to be played is greater than a preset threshold value.

4. The method according to claim 3, further comprising:
during the downloading-while-playing process, receiving, by the CDN server, packet loss information, which is fed back by the terminal through a heartbeat message, of the played code stream; and
regulating, by the CDN server, a bandwidth of the downloading until the packet loss information is not received any longer.

5. A terminal, comprising: a bandwidth acquisition module, a determination module and a playing-while-downloading module,
wherein the bandwidth acquisition module is configured to acquire code rate information of a media file requested to be played from a Content Delivery Network (CDN) server,
wherein the determination module is configured to determine whether the code rate meets a playing-while-downloading condition and notify a result of the determination to the playing-while-downloading module, and
wherein the playing-while-downloading module is configured to make a request of downloading a file which is requested to be downloaded by a user of the terminal to the CDN server while playing the media file, when the result of the determination indicates that the code rate meets the playing-while-downloading condition,
wherein the file requested to be downloaded by the user of the terminal is an advertisement video of an operator for the user, that is, the file requested to be downloaded and the media file requested by the terminal to be played are two different media files,
wherein the bandwidth acquisition module is configured to acquire the code rate information of the media file requested to be played from the CDN server in a manner of:
sending a first request message to the CDN server, the first request message carrying information of the media file requested by the terminal to be played; and
receiving a first response message sent by the CDN server, the first response message carrying a code rate of the media file requested by the terminal to be played and a field indicating that the CDN server supports a playing-while-downloading function, wherein the playing-while-downloading condition is a condition that:
a difference between a current bandwidth of the terminal and the code rate of the media file requested to be played is greater than a preset threshold value,
wherein the playing-while-downloading module is configured to make the request of downloading the file which is requested to be downloaded by the user to the CDN server while playing the media file in a manner of:
sending a second request message to the CDN server, wherein the second request message carries information of the file which is requested to be downloaded by the user and a field indicating that the terminal supports the playing-while-downloading function; and
downloading the file which is requested to be downloaded by the user from the CDN server according to a path of the file which is requested to be downloaded by the user, a username and a password, which are carried in a second response message sent by the CDN server, and simultaneously receiving a code stream of the media file from the CDN server for playing, so as to make use of remaining bandwidth to download other media files different from the media file while playing the media file, realize the downloading of a media file without having influence on the TV watching.

6. The terminal according to claim 5, further comprising:
a playing monitoring module, which is configured to, during the downloading-while-playing process, feed packet loss information of the played code stream back to the CDN server through a heartbeat message, so that the CDN server regulates a bandwidth of the downloading of a media server of the CDN server.

7. A Content Delivery Network (CDN) server, comprising: a Real Time Streaming Protocol (RTSP) server and a media server,
wherein the RTSP server comprises a receiving module, a bandwidth response module and a playing-while-downloading response module,
wherein the receiving module is configured to: receive a first request message of acquiring code rate information of a media file requested to be played and a second request message from a terminal and notify the bandwidth response module and the playing-while-downloading response module, wherein the second request message carries information of a file which is requested to be downloaded by a user and a field indicating that the terminal supports a playing-while-downloading function,
wherein the bandwidth response module is configured to: send a first response message to the terminal after receiving the notification from the receiving module, wherein the first response message carries the code rate information of the media file requested by the terminal to be played and a field indicating that the CDN server supports the playing-while-downloading function, so that the terminal can determine whether the code rate meets a playing-while-downloading condition,
wherein the playing-while-downloading response module is configured to: send a second response message to the terminal after receiving the notification from the receiving module, the second response message carrying a path of the file which is requested to be downloaded by the user, a username and a password, and simultaneously notify the media server to send a code stream of the media file to the terminal, and the media server is configured to: send the code stream of the media file to the terminal after receiving the notification from the playing-while-downloading response module, and provide to the terminal the file requested to be downloaded by the user, so as to make use of remaining bandwidth to download other media files different from the media file while playing the media file, realize the downloading of a media file without having influence on the TV watching,
wherein the file requested to be downloaded by the user of the terminal is an advertisement video of an operator for the user, that is, the file requested to be downloaded and the media file requested by the terminal to be played are two different media files,
wherein the playing-while-downloading condition is a condition that:
a difference between a current bandwidth of the terminal and the code rate of the media file requested to be played is greater than a preset threshold value.

8. The CDN server according to claim 7,
wherein the receiving module is further configured to: during the downloading-while-playing process, receive packet loss information, which is fed back by the terminal through a heartbeat message, of the played code stream, and notify a bandwidth regulation module in the RTSP server,
wherein the bandwidth regulation module is configured to: notify the media server to regulate a bandwidth of the downloading until the packet loss information is not received any longer, and
wherein the media server is further configured to: regulate the bandwidth of the downloading after receiving the notification from the bandwidth regulation module.

9. A system for implementing playing while downloading in an Internet Protocol Television (IPTV) system, comprising: a terminal and a Content Delivery Network (CDN) server,
wherein the terminal comprises:
a first memory;
one or more first processors; and
a bandwidth acquisition module, a determination module and a playing-while-downloading module, and the bandwidth acquisition module, the determination module and the playing-while-downloading module are stored in the first memory and executed by the one or more first processors,
wherein the bandwidth acquisition module is configured to acquire code rate information of a media file requested to be played from a Content Delivery Network (CDN) server,
wherein the determination module is configured to determine whether the code rate meets a playing-while-downloading condition and notify a result of the determination to the playing-while-downloading module, and
wherein the playing-while-downloading module is configured to make a request of downloading a file which is requested to be downloaded by a user of the terminal to the CDN server while playing the media file, when the result of the determination indicates that the code rate meets the playing-while-downloading condition,
wherein the file requested to be downloaded by the user of the terminal is an advertisement video of an operator for the user, that is, the file requested to be downloaded and the media file requested by the terminal to be played are two different media files, wherein the bandwidth acquisition module is configured to acquire the code rate information of the media file requested to be played from the CDN server in a manner of:
sending a first request message to the CDN server, the first request message carrying information of the media file requested by the terminal to be played; and
receiving a first response message sent by the CDN server, the first response message carrying a code rate of the media file requested by the terminal to be played and a field indicating that the CDN server supports a playing-while-downloading function,
wherein the CDN server comprises:
a second memory;
one or more second processors; and
a Real Time Streaming Protocol (RTSP) server and a media server,
wherein the RTSP server comprises a receiving module, a bandwidth response module and a playing-while-downloading response module, and the receiving module, the bandwidth response module and the playing-while-downloading response module are stored in the second memory and executed by the one or more second processors,
wherein the receiving module is configured to: receive a first request message of acquiring code rate information of a media file requested to be played and a second request message from a terminal and notify the bandwidth response module and the playing-while-downloading response module, wherein the second request message carries information of a file which is requested to be downloaded by a user and a field indicating that the terminal supports a playing-while-downloading function,
wherein the bandwidth response module is configured to: send a first response message to the terminal after receiving the notification from the receiving module, wherein the first response message carries the code rate information of the media file requested by the terminal to be played and a field indicating that the CDN server supports the playing-while-downloading function, so that the terminal can determine whether the code rate meets a playing-while-downloading condition,
wherein the playing-while-downloading response module is configured to: send a second response message to the terminal after receiving the notification from the receiving module, the second response message carrying a path of the file which is requested to be downloaded by the user, a username and a password, and simultaneously notify the media server to send a code stream of the media file to the terminal, and
the media server is configured to: send the code stream of the media file to the terminal after receiving the notification from the playing-while-downloading response module, and provide to the terminal the file requested to be downloaded by the user, so as to make use of remaining bandwidth to download other media files different from the media file while playing the media file, realize the downloading of a media file without having influence on the TV watching,
wherein the playing-while-downloading condition is a condition that:
a difference between a current bandwidth of the terminal and the code rate of the media file requested to be played is greater than a preset threshold value.

* * * * *